(No Model.)

J. L. RICHARDS.
Harness Collar Pad.

No. 237,445.  Patented Feb. 8, 1881.

Witnesses
Wm Zimmerman
Chas H. Wood

Inventor.
Joseph L. Richards
By Gridley & Co
Attys.

UNITED STATES PATENT OFFICE.

JOSEPH L. RICHARDS, OF BUCHANAN, MICHIGAN.

HARNESS-COLLAR PAD.

SPECIFICATION forming part of Letters Patent No. 237,445, dated February 8, 1881.

Application filed November 22, 1880. (No model.)

*To all whom it may concern:*

Be it known that I, JOSEPH L. RICHARDS, of Buchanan, in the county of Berrien and State of Michigan, have invented certain new and useful Improvements in Harness-Collar Pads; and I do hereby declare the following to be a full, clear, and exact description thereof, which will enable others skilled in the art to which my invention appertains to make and use the same, reference being had to the accompanying drawings, forming a part hereof, and in which—

Figure 1:
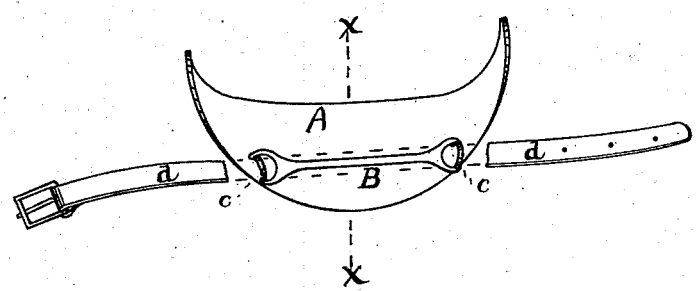
Figure 2:
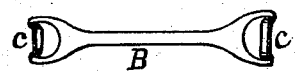
Figure 3:
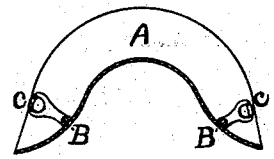

Figure 1 represents a side view of the same, in perspective, completed and ready for use. Fig. 2 represents a bar provided with loops at each end, and which is attached to the pad; and Fig. 3 represents a cross-section of the pad, taken on the line $x\,x$, Fig. 1.

Like letters of reference indicate like parts.

My invention relates to that class of harness-collar pads which are made of sheet-zinc and attached to the collar by means of straps; and it consists of the combination and construction of the several parts, as hereinafter described and claimed.

I am aware that horse-collar pads have heretofore been made consisting of two curved metal plates so attached together as to have an air-space between them, and having attached to the upper plate metal loops, the openings of which are arranged at right angles to the length of the pad, to permit the straps at the ends of the collar to pass through the loops, and thereby attach the pad to the collar, as shown and described in Letters Patent No. 105,917. Such pads are objectionable on account of the cost thereof and their liability to get out of order by reason of the weight of the collar and hames crushing down the upper plate and loops.

I am also aware that metal horse-collar pads have been made in the form shown, and having permanently attached to the upper surface thereof a skeleton metal frame, to each side edge of which are attached or cast two loops, through which are passed straps for the purpose of attaching the pad to the collar, as shown and described in Letters Patent No. 132,515. Such pads are also objectionable on account of their cost and on account of the loops projecting outside of the edge of the pad and collar, as they are liable to be broken and to injure the animal.

In the drawings, A represents a horse-collar pad made of one piece of sheet-zinc, and so formed as to conform to the shape of the neck of the animal and to resist the pressure of the collar and hames. Upon the upper surface of the pad, and near each side edge thereof, are riveted or otherwise firmly attached thereto bars B, which are made preferably of malleable iron, and the ends of which are formed into flat loops $c$, under or through which straps $d$, as shown across the pad in dotted outline only, are passed, and by which the pad is firmly attached to the collar.

It will be observed that the bars B are made of sufficient length to bring the loops $c$ close to the ends of the pad when placed, as shown, near the side edges thereof, and that the openings of the loops are arranged in line, or nearly so, with the length of the pad, by which arrangement of the looped bars upon the pad the loops are covered by the collar, and consequently less liable to be broken by outward contact, the full weight of the collar and hames does not rest upon the loops, and the pad is more conveniently secured to the collar, avoiding the necessity of unbuckling the collar for the purpose of putting the pad in place. By the use of straps passing through the loops in the bars the pad is held firmly by buckling the straps around the collar, thus preventing wabbling or becoming misplaced when in use on the neck of the animal.

By constructing the pad as shown and described I am enabled to furnish to the public and to the trade a cheaper and more durable harness-collar pad, and one which can be more readily and easily applied to the collar than those now in use.

Having thus described my invention, what I claim as new, and desire to secure by Letters Patent, is—

In combination with a harness-collar pad, A, made in one piece, of sheet metal, the bars B, provided with the loops $c$, arranged on the sides and ends of the pad, substantially as shown and described.

JOSEPH L. RICHARDS.

Witnesses:
WM. ZIMMERMAN,
WM. PEARS.